Patented Feb. 27, 1951

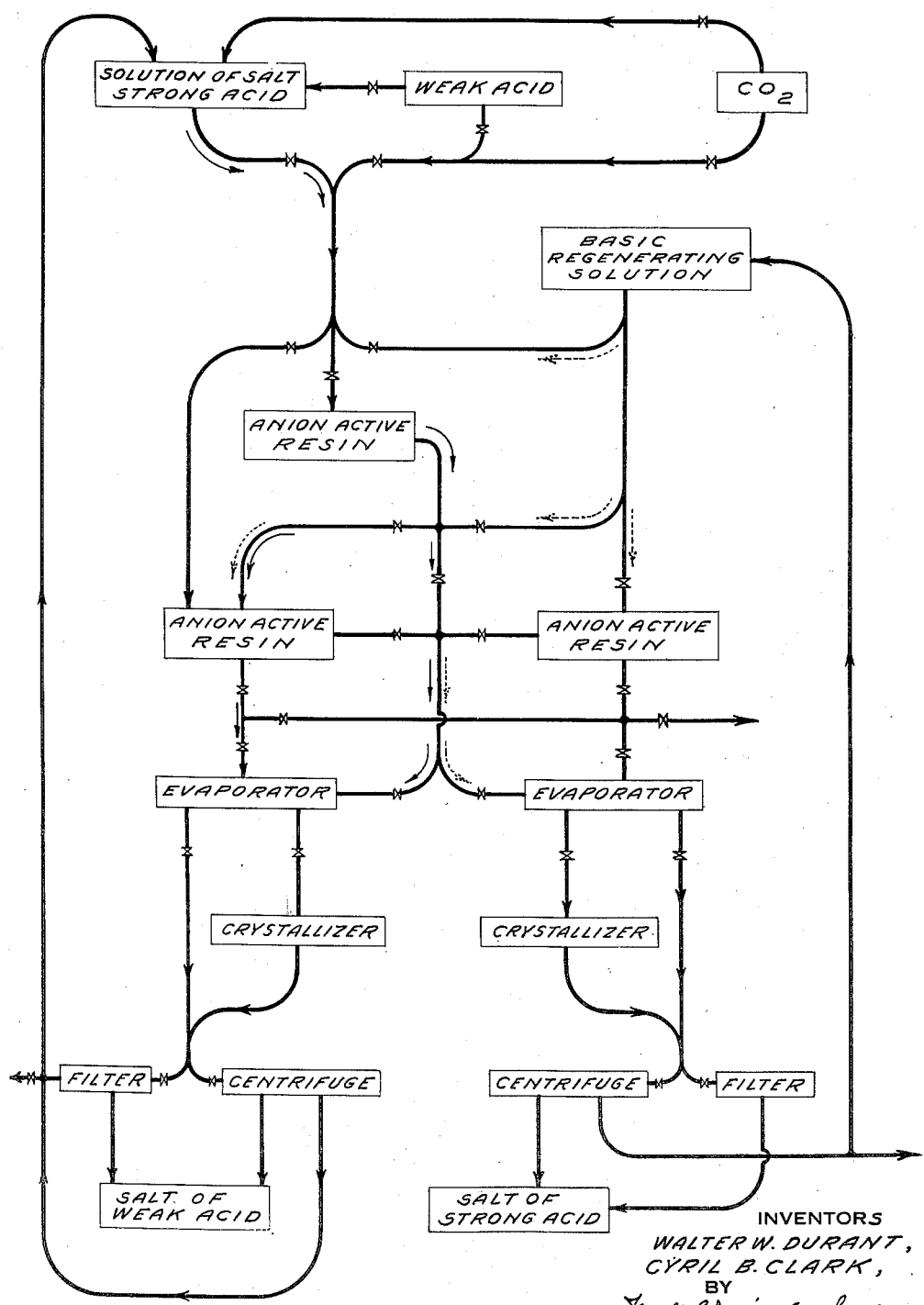

2,543,658

UNITED STATES PATENT OFFICE 2,543,658

MANUFACTURE OF SALTS OF WEAK ACIDS

Walter W. Durant, Old Greenwich, Conn., and Cyril B. Clark, Scarsdale, N. Y., assignors to American Cyanamid Company, New York, N. Y., a corporation of Maine Application November 14, 1942, Serial No. 465,542

7 Claims. (Cl. 23—64)

This invention relates to the conversion of a salt of a strong acid into the corresponding salt of a weaker acid. It is particularly concerned with the production of carbonates from nitrates or chlorides.

The production of certain carbonates such as sodium carbonate from a salt of a strong acid such as sodium chloride has been carried out by means of the Le Blanc process or by means of the Solvay process as well as by a few other processes which have been employed to a limited extent. The Solvay process is generally considered to be more economical than the Le Blanc process and accordingly the Solvay process is in more general use. However, the Solvay process depends upon the insolubility of bicarbonate of soda in an ammonium chloride solution as well as upon many other factors. Therefore, for the conversion of many salts to the corresponding carbonates, the Solvay process cannot be used or it is not economical. Similarly, the Solvay process is not necessarily applicable to the conversion of salts of strong acids into salts of weak acids other than carbonic acid.

It is therefore an object of this invention to provide a process for the conversion of salts of strong acids into salts of weak acids which does not depend upon the principles of previously known processes.

Another object of this invention is to provide a process which is particularly adapted to the conversion of salts of amino compounds such as guanidine and strong acids into salts of weaker acids. For example, guanidine chloride or guanidine nitrate may be converted into other salts such as the carbonate, acetate, etc.

Still another object of our invention is to provide a process for the conversion of potassium chloride or potassium nitrate into the corresponding salts of weak acids, e. g., potassium carbonate.

These and other objects are attained by treating an aqueous solution containing a weak acid and a salt of a strong acid with an anion active resin. The process is conveniently carried out by passing the aforementioned solution through one or more beds of an anion active resin.

The drawing is a diagrammatic representation of a convenient method for carrying out our process and it is schematic in that for practical operation many of the flow lines would comprise two or more separate conduits. The solid black arrows indicate the general direction of the flow during the conversion phase of the process while the broken line arrows indicate the general direction of the flow during regeneration of the resin beds.

A solution of the salt of a strong acid is prepared and a weak acid is introduced into this solution. In case bicarbonates or carbonates are to be prepared, carbon dioxide may be introduced under pressure into a suitable mixing tank, the salt of the strong acid being, or having been dissolved in water. The solution is preferably saturated with carbon dioxide at a pressure of about 100–500 pounds per square inch in order that sufficient carbon dioxide be dissolved in the water to convert the salt of the strong acid into the carbonate on treatment with the anion active resin. The reaction may be carried out at ordinary atmospheric pressure if salts of nonvolatile, stable acids are to be prepared.

In general, an aqueous feed solution which contains the salt of a strong acid and the equivalent proportion of, or an excess of, the weak acid which is to be used, is prepared. The aforementioned solution is passed through a bed of an anion active resin and preferably through a plurality of beds of anion active resin arranged in series. The use of two or more beds of resin is advantageous in that a high degree of conversion of the salt of the strong acid to the salt of the weak acid is attained. When the first anion active resin bed is exhausted the feed solution is introduced directly into the second bed of resin which is only partially exhausted, and the effluent therefrom is passed through another activated bed of resin. The exhausted bed of resin may now be regenerated while the process continues with the other resin beds. In other words, two beds of resin may be utilized in the process while a third bed is being regenerated. The effluent from the second resin bed which contains the salt of the weak acid may be evaporated partially or completely in order to recover the salt in dry form. The drawing illustrates one method of obtaining the dried salt. The solution is first evaporated and then, optionally, passed into a crystallizer after which the salt is centrifuged or filtered and, if necessary, further dried. The filtrate or centrifugate may be returned to a make-up tank for use in preparing additional quantities of solution to be treated, thus avoiding wastage of any dissolved salt.

The resin beds are reactivated by passing a solution of an alkaline material through the beds. Thus, for example, a 0.1–10% solution of one of the following salts may be employed: sodium hydroxide, sodium carbonate, potassium hydroxide, potassium carbonate, etc. Other alkaline salts may be used if desired. The effluent from the beds during the activation part of the cycle may be discarded if the salt formed, such as sodium chloride, is not of sufficient value to warrant recovery. If, however, the anion active resin has been employed to remove relatively valuable anions such as the nitrate ion, it may be economical to recover the anion in the form of a desirable metal or amine salt. If the anion is to be recovered from the bed, the activating compound is so chosen that the desired salt of the anion may be obtained. Thus, for example, if the anion resin bed is saturated with the nitrate ion, it may be treated with potassium hydroxide or potassium carbonate in order to obtain potassium nitrate which could be recovered and used as a fertilizer or for many other purposes. If the resin bed is saturated with the chloride ion it will probably be uneconomical to recover the salt and therefore the cheapest regenerating solution would be used, i. e., a solution of sodium hydroxide or sodium carbonate.

If the salt formed in the activation of the anion active resin is to be recovered, the effluent during the activation part of the cycle is evaporated partially or wholly or introduced into a crystallizer and the salt is finally recovered by centrifuging or filtration. The filtrate or centrifugate may be returned to a make-up tank for the regenerating solution if advantageous.

The following examples in which the proportions are in parts by weight, except as otherwise indicated, are given by way of illustration and not in limitation.

Example 1

About 1180 parts of an anion active resin (e. g., resin "A") are packed into a cylindrical column. The resin is washed with about 50,000 parts of water and, after standing for about 10 hours, it is washed with an additional 8,000 parts of water. 9,000 parts of a 3% solution of sodium carbonate are passed over the resin over a period of about 70 minutes. The resin is then washed with 50,000 parts of water, thereby providing a bed of an activated resin.

62 parts of potassium chloride dissolved in 2,000 parts of water are saturated with carbon dioxide under a pressure of about 500 pounds per square inch. The resulting solution is run into the resin bed and allowed to stand in contact with the resin for about 15 minutes, after which the solution is drawn off in fractions each of which is analyzed for the content of potassium bicarbonate. The first 500 parts of effluent which are drawn off during an interval of about 10 minutes contain about 86% of the potassium as the bicarbonate. The second and third fractions are effluent, each containing about 500 parts and each drawn off during an interval of about 10 minutes, showed a conversion of the potassium to the bicarbonate of about 86% and 80% respectively. The fourth fraction comprises about 400 parts and it is drawn off during an interval of about 5 minutes. It shows a conversion of the potassium to the bicarbonate of about 66%.

About 1,000 parts of water are passed through the column in order to remove the treated solution remaining in the resin bed. About 61% of the potassium contained in this wash water is in the form of the bicarbonate. About 87% of potassium is recovered and the yield of potassium bicarbonate is about 65%.

Example 2

Example 1 is repeated except that the effluent is drawn off in fractions of 500 parts over intervals of 15 minutes for each of the first three fractions and 10 minutes for the fourth fraction. The proportion of potassium in the form of the bicarbonate is about 91% in the first fraction, about 94% in the second and third fractions, about 91% in the fourth fraction and about 86% in the wash solution. About 93% of the potassium is recovered and the yield of bicarbonate is about 85%.

Example 3

About 80 parts of guanidine hydrochloride dissolved in about 2,000 parts of water is saturated with carbon dioxide under a pressure of about 500 pounds per square inch. This solution is passed into a resin bed such as that described in Example 1 and allowed to remain in contact with the resin for about 45 minutes. The solution is then drawn off in fractions of about 500 parts over intervals of about 10 minutes for the first fraction, 35 minutes for the second fraction, 30 minutes for the third fraction and 30 minutes for the fourth fraction. The resin bed is washed with 2 portions of water, each of about 1,000 parts. The proportion of guanidine in the form of the bicarbonate in the first fraction is about 91%, in the second fraction about 92%, in the third fraction 91%, in the fourth fraction 88% and in the first and second wash water fractions it is about 83% and 88% respectively. A yield of about 94% of guanidine bicarbonate is obtained.

Example 4

101 parts of guanidine nitrate are dissolved in about 2,000 parts of water and saturated with carbon dioxide at a pressure of about 500 pounds per square inch. The resulting solution is passed into a resin bed such as that described in Example 1. Four fractions of the effluent are drawn off during intervals of time of about 10 minutes, 18 minutes, 12 minutes, and 15 minutes respectively. The resin bed is washed with two portions of water each of about 1,000 parts. A yield of about 89% of guanidine bicarbonate is obtained.

Example 5

A solution such as the total effluent obtained in Example 1 and containing potassium bicarbonate and potassium chloride in a ratio of about 90% of the former to 10% of the latter is passed through a bed of activated resin such as that described in Example 1. The first 2,000 parts of effluent which are collected over a period of about 40 minutes contain about 99% of the potassium as the bicarbonate. During the passage of the next 1,000 parts of solution over a period of about 16 minutes, the bicarbonate content drops to about 96% of the potassium. This example shows the desirability of employing two beds of anion active resin in series.

The bicarbonates may in each case be converted to the corresponding carbonates by heating if desired.

Our process may be employed for the conversion of many other salts of strong acids into salts of weak acids. Thus, for example, guanidine hydrochloride or guanidine nitrate may be converted to guanidine acetate, guanidine borate, guanidine formate, guanidine benzoate, etc. Similarly, our process is adapted to the conversion of the salts of any of the amines and strong acids to the corresponding salts of the amines and relatively weaker acids. Methylamine hydrochloride, ethylene diamine hydrochloride and other amine salts of strong acids such as hydrochloric acid and nitric acid may readily be converted to the corresponding salts of weaker acids by means of our process. Furthermore, biguanide salts such as biguanide chloride and guanyl urea chloride may be converted to the corresponding carbonates or to other salts of weak acids by utilizing the methods described herein. Another application of our process is in the conversion of salts of choline and its homologs,

Preparation of resin "A"

24 parts of urea
26 parts of guanidine nitrate
98 parts of formalin (37% formaldehyde in water)
6.3 parts of soda ash
61 parts of water The water, formalin and soda ash are charged into a kettle, preferably glass-lined, and equipped with a reflux condenser and an agitator. The urea and guanidine nitrate are then added and the resulting mixture is heated to the reflux point and maintained at this point for about 1–6 hours. During this operation the mixture is thoroughly agitated. This mixture is transferred to a suitable vessel, preferably glass-lined, and heated to about 90° C. To this with vigorous agitation, about 3.5 parts of hydrochloric acid (specific gravity 1.19) in about 6.1 parts of water are added gradually and the material is then cooled as quickly as possible to about 70° C., thereby gelling the material. The gelled material should be further cooled, optionally by removing it from the vessel, breaking up into small pieces and spreading out on trays. The resulting material is ground to any desired fineness, e. g., a size that will pass 8 mesh.

The ground gel is distributed evenly on trays, preferably glass-lined, and these trays are placed in a suitable drier. The temperature is raised to about 50° C., held for about 5–6 hours, raised about 10° C. every half hour until about 100° C. is reached and is maintained at the latter temperature for about 2 hours. If necessary, the material may be reground or screened to a suitable size.

Any other anion active resin may be substituted for both or all of the anion active resins in the foregoing examples, e. g., m-phenylene diamine-formaldehyde resins, aliphatic polyamine-formaldehyde resins, alkyl and aryl substituted guanidine-formaldehyde resins, alkyl and aryl substituted biguanide-, and guanyl urea-formaldehyde resins, etc. as well as the corresponding condensation products of other aldehydes, e. g., acetaldehyde, crotonaldehyde, benzaldehyde, furfural or mixtures of these or other aldehydes. The resins such as those prepared from guanidine, guanyl urea, biguanide, the polyamines, and other materials which do not form substantially insoluble condensation products with formaldehyde for most practical purposes are preferably insolubilized with suitable aldehyde-reactive materials, e. g., urea, the aminotriazines, especially melamine, the guanamines which react with formaldehyde to produce insoluble products, etc. Furthermore, mixtures of the active materials as well as mixtures of the insolubilizing materials may be used. The anion active resins may be prepared in the same general manner as that described in Patent Numbers 2,251,234 or 2,285,750. Usually it is convenient to employ the salts of the bases such as guanidine but the free bases may also be used. Examples of suitable salts for use in the preparation of anion active resins are: guanidine carbonate, guanidine sulfate, biguanide sulfate, buguanide nitrate, guanyl urea sulfate, guanyl urea nitrate, guanyl urea carbonate, etc.

Obviously, many modifications and variations in the processes and compositions described above may be made without departing from the spirit and scope of the invention as defined in the appended claims.

We claim:

1. A process for converting a salt of a strong acid into the corresponding salt of a weak acid which comprises treating an aqueous solution containing a salt of a strong acid and at least a substantially equivalent proportion of a weak acid with an anion active resin which has been rendered anion active by treatment with an alkali.

2. A process for converting a salt of a strong acid into a salt of a weak acid which comprises passing an aqueous solution containing a salt of a strong acid and at least a substantially equivalent proportion of a weak acid through at least one bed of an anion active resin which has been rendered anion active by treatment with an alkali.

3. A process of converting a salt of a strong acid into a salt of a weak acid which comprises passing an aqueous solution containing a salt of a strong acid and at least a substantially equivalent proportion of a weak acid through a bed of anion active resin, passing the effluent therefrom through at least one additional bed of anion active resin, continuing said process until the first-mentioned bed of resin is exhausted and thereafter passing said solution through the last-mentioned anion active resin which has been rendered anion active by treatment with an alkali.

4. A process for converting a salt of a strong acid into the corresponding carbonate which comprises passing an aqueous solution saturated with carbon dioxide gas at a pressure of at least 100 pounds per square inch and containing a salt of a strong acid through at least one bed of an anion active resin.

5. A process as in claim 4 wherein the salt of the strong acid is guanidine nitrate.

6. A process as in claim 4 wherein the salt of the strong acid is potassium chloride.

7. A process as in claim 4 wherein the anion active resin is an insolubilized formaldehyde condensation product of guanidine.

WALTER W. DURANT.
CYRIL B. CLARK.

REFERENCES CITED

The following references are of record in the file of this patent:

UNITED STATES PATENTS

| Number | Name | Date |
| --- | --- | --- |
| Re. 16,497 | Caps | Dec. 7, 1926 |
| 1,992,324 | Rusberg | Feb. 26, 1935 |
| 2,151,883 | Adams et al. | Mar. 28, 1939 |
| 2,155,477 | Drujon | Apr. 25, 1939 |
| 2,157,511 | Urbain | May 9, 1939 |
| 2,198,874 | Holmes | Apr. 30, 1940 |
| 2,251,234 | Swain | July 29, 1941 |
| 2,285,750 | Swain | June 9, 1942 |

FOREIGN PATENTS

| Number | Country | Date |
| --- | --- | --- |
| 227 | Great Britain | of 1886 |

OTHER REFERENCES

Schwartz et al.: "Removal of Chlorides and Sulfates by Synthetic Resins," Ind. and Eng. Chem., vol. 32, No. 11, Nov. 1940, pages 1462–65.

Report on Ion Exchange, Chem. and Met. Eng., vol. 54, July 1947, page 124.